Patented Aug. 24, 1926.

UNITED STATES PATENT OFFICE.

EDWARD A. RUDIGIER, OF BALTIMORE, MARYLAND, ASSIGNOR TO STANDARD DEVELOPMENT COMPANY, A CORPORATION OF DELAWARE.

FUEL OIL AND PROCESS OF MAKING THE SAME.

No Drawing.    Application filed November 21, 1924. Serial No. 751,393.

The object of the present invention is the manufacture of a fuel oil. More particularly, the invention is directed to the proper blending or mixing of a very viscous hydrocarbon material or one which is nearly solid when cold, with a comparatively low viscosity fuel oil, to produce a liquid fuel which may be burned in the ordinary type of fuel oil burners when atomized with steam or other fluid means. Specifically the invention is concerned with the manufacture of a fuel oil by the admixture in proper proportions of a so-called paraffin sludge with a fuel oil such as that produced by the cracking of a heavy Mexican crude oil.

In the manufacture of commercial oil products, it is common practice, as is well known in the art, after the distillation and separation of the crude oil into various fractions, to subject the various fractions to the action of sulfuric acid as one step in the so-called treating process. This treatment with acid may be carried out in stages. As a result of this acid treatment, there is obtained, in addition to the treated oil, an acid sludge which contains tarry and other viscous material together with the unused and spent acid.

It is well known that a very viscous sludge is ordinarily obtained by the treatment with acid of certain oil fractions which may contain small quantities of paraffin. For example, in the manufacture of paraffin, an oil fraction having a gravity within certain requisite limits, that is, approximately 25° to 37° Bé., is first separated from the crude oil by the usual distillation means. This fraction is then passed through the chillers and wax presses to separate the paraffin therefrom. The pressed oil distillate, however, still contains small quantities of paraffin, or paraffin-like matter, as well as unsaturated and naphthene hydrocarbons. It is the carbonization and sulfonation by acid of these compounds of comparatively high molecular weight that produces the so-called paraffin sludge in the treatment of such an oil fraction with acid.

This sludge is ordinarily steamed to recover the excess of acid therefrom and the residuum from the steaming process is frequently so viscous that when it is allowed to cool to ordinary atmospheric temperatures, it is sufficiently solid to be shovelled and is frequently admixed with coke or coal and used as a refinery fuel when obtained in this form. The use of a fuel of this type is far from convenient and the problem of its proper disposal is acute, especially in the more modern of the present day refineries where practically all of the heating is done by means of the combustion of fuel oil, atomized by steam, in the fuel oil burners. The sludge itself is so viscous that even when heated to as high a temperature as is practicable, it is not sufficiently mobile to flow freely and consequently cannot be used in the same manner as more liquid fuel oils.

I have now found that this paraffin sludge can be very conveniently handled and a practical fuel oil obtained therefrom by blending or mixing the sludge with a fuel oil produced by the cracking of certain types of crude oil, such as a heavy Mexican crude. It is desirable that the fuel oil be of approximately the same specific gravity as the sludge. Inasmuch as the sludge is very viscous, as has previously been pointed out, it is also desirable that the fuel oil used be comparatively fluid so that the finished product may not be too viscous to flow easily. For most purposes the blended fuel oil should have a Furol viscosity of approximately 250 to 350 seconds at 122° F.

Although many fuel oils or residuums having the necessary properties may be used as solvent and blending means with the paraffin sludge, I have found that especially desirable results may be realized by the use of a fuel oil produced from a heavy Mexican crude oil which has first been topped and the bottoms therefrom subjected to a cracking operation so as to leave a final residuum or fuel oil approximately in quantity 80 to 85% of the original oil. This residuum or fuel oil may then be mixed, preferably by injecting steam, with the paraffin sludge in any proportions desired, although it has been found in order to keep the viscosity of the final product low enough to enable the mixture to flow under operating conditions, that not more than 60% of the sludge should be blended with 40% of the residuum mentioned. In many cases it is desirable to mix equal quantities of the sludge with the residuum. By this means, a fuel oil is obtained which has a vicosity of approximately 300 seconds Furol at 122° F. Such a product is readily usable as a refinery fuel.

It will be understood that the improved fuel oil is not restricted to two components as specified in the illustrative examples. The viscosity and other properties may be adjusted by the addition of other components, such as various grades of fuel oil.

I claim:

1. A fuel oil comprising a viscous sludge from the acid treatment of hydrocarbon oils and a less viscous fuel oil having approximately the same specific gravity as said sludge.

2. A fuel oil comprising a blend of paraffin sludge with a fuel oil residuum obtained by cracking a topped heavy Mexican oil.

3. A fuel oil comprising a blend of paraffin sludge with the residuum from a heavy Mexican oil, said residuum comprising not more than 85% of the quantity of the original oil.

4. A fuel oil comprising paraffin sludge and a residuum from a heavy Mexican oil, said residuum being produced by cracking a topped heavy Mexican oil and comprising not more than 85% of the quantity of the original oil.

5. A fuel oil comprising not more than 60% of paraffin sludge and not more than 40% of a less viscous oil of approximately the same specific gravity.

6. A fuel oil comprising approximately 50% of paraffin sludge blended with a fuel oil residuum obtained by cracking a topped heavy Mexican oil.

7. Process of making a fuel oil, comprising bringing together a viscous sludge from the acid treatment of hydrocarbon oils and a less viscous oil, and mixing by injecting steam.

EDWARD A. RUDIGIER.